(12) United States Patent
Yasuhira

(10) Patent No.: US 6,881,287 B2
(45) Date of Patent: Apr. 19, 2005

(54) PACKAGING BAG SEALING METHOD AND A FILLED AND SEALED PACKAGING BAG

(75) Inventor: Masanori Yasuhira, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 82 days.

(21) Appl. No.: 10/364,197

(22) Filed: Feb. 11, 2003

(65) Prior Publication Data

US 2003/0152297 A1 Aug. 14, 2003

(30) Foreign Application Priority Data

Feb. 13, 2002 (JP) ........................................ 2002-035292

(51) Int. Cl.$^7$ .............................................. B32B 31/16
(52) U.S. Cl. ................... 156/73.1; 156/308.4; 156/311; 53/479; 53/373.7
(58) Field of Search ............................... 156/73.1, 290, 156/292, 308.2, 308.4, 311, 498, 580.1, 580.2, 583.1; 53/477, 479, 373.7, 375.9, DIG. 2; 383/38, 40, 93, 94; 493/189, 190, 209

(56) References Cited

U.S. PATENT DOCUMENTS

| 4,403,465 A | * | 9/1983 | Bachner ........................ 53/477 |
| 4,517,790 A | * | 5/1985 | Kreager ........................ 53/552 |
| 4,581,873 A | * | 4/1986 | Knuppertz et al. ......... 53/374.8 |
| 4,588,554 A | * | 5/1986 | Kaartinen et al. ............. 422/61 |
| 4,734,142 A | * | 3/1988 | Creswell ..................... 156/73.1 |
| 4,828,851 A | * | 5/1989 | Romagnoli ................... 426/79 |
| 4,997,083 A | * | 3/1991 | Loretti et al. ................ 206/219 |
| 5,501,887 A | * | 3/1996 | Tanaka et al. .............. 428/35.2 |
| 6,468,259 B1 | * | 10/2002 | Loretti et al. ................ 604/410 |

FOREIGN PATENT DOCUMENTS

JP  3079185 (03-212327)     8/2000

* cited by examiner

Primary Examiner—James Sells
(74) Attorney, Agent, or Firm—Koda & Androlia

(57) ABSTRACT

An area where a liquid substance, for instance, is present inside a bag, that is, the area where the liquid substance adheres to the inner surface of the bag, is ultrasonically sealed (thus forming an ultrasonically sealed area), and then an area that is separated from the ultrasonically sealed area by a predetermined distance toward the edge of the mouth of the bag is heat-sealed (thus forming a heat-sealed area), so that the a portion of the liquid substance, that is separated and is present above the ultrasonically sealed area, is sealed inside the space between the two sealed areas.

6 Claims, 4 Drawing Sheets

PACKAGING BAG SEALING METHOD AND A FILLED AND SEALED PACKAGING BAG

BACKGROUND OF THE INVENTION

1. Field of the Invention

The present invention relates to a sealing method applicable to a packaging bag in which the opening area of the bag that contains packaged matter is ultrasonically sealed and further relates to a packaging bag which is sealed by such a method.

2. Prior Art

Opening areas of packaging bags that are filled with, for instance, liquids, powders, etc. are sealed in several ways. In one method, sealing is performed by holding the bag together with the content (the packaged matter) with a sealing tool in a horizontal attitude in the position where the content is present (such position being where the packaged matter adheres to the inner surface of the bag). This method (which is called "sealing in liquid" in cases where the packaged matter is a liquid substance, see the prior art below) is advantageous in which it leaves as little air as possible inside the sealed space of the bag after sealing.

However, if the method above is accomplished by general heat-sealing (heat-sealing that uses heating plate, or impulse sealing), a portion of the packaged matter adhering to the inner surface of the bag is caused to bite into the sealed area (this is called a "bite-in seal"), thus causing an incomplete sealing of the opening area. In view of this, ultrasonic sealing is utilized ordinarily. With the ultrasonic sealing, the packaged matter adhering to the inner surface of the bag is separated upward and downward, and then this area is sealed; accordingly, the problem of a "bite-in seal" is avoided.

However, the ultrasonic sealing has problems. For instance, in cases where the content is a liquid substance, if the ultrasonic sealing is performed in the position where the liquid substance adheres to the opening area, the area beneath the ultrasonically sealed area 1, as seen from FIG. 4, forms a sealed space that contains liquid substance 2 alone, with air excluded, and a liquid substance 2a that is separated by the ultrasonically sealed area 1 adheres to the inner surface of the bag above the ultrasonically sealed area 1. Since this liquid substance 2a is present outside the sealed space, the liquid substance 2a subsequently spills out of the bag mouth and contaminates the surface of the bag. Even if the liquid substance 2a does not spill, the external appearance of the product is deteriorated; and there are also problems in terms of hygiene in cases where the packaged matter is a foodstuff.

This problem can be overcome by way of, as shown in, for instance, Japanese Patent No. 3079185, applying a broad heat-sealing so that it overlaps with the ultrasonically sealed area 1 (which ordinarily has a width of 2 to 3 mm) after executing the ultrasonic sealing. However, if this is done, the liquid substance is volatilized during heat-sealing as shown in FIG. 5, and this volatilized portion of the liquid substance is sealed in (i.e., the upper portion where no liquid substance is present is fused first, so that a portion of the vapor is sealed in). Consequently, numerous gas bubbles 4 enter the heat-sealed area 3, and the external appearance of the product is damaged; and in some cases, a portion of the liquid substance is squeezed out of the bag mouth "as is" as a result of being pressed by the press-holding members of the heat-sealing plates, etc. This liquid substance contacts the press-holding members of the heating plates, etc. and evaporates, thus contaminating the pressing surfaces of the press-holding members. Liquid substance that is not completely evaporated contaminates the bag surfaces.

In cases where the packaged matter is not a liquid substance, the problem of gas bubbles, etc. can be avoided; however, the packaged matter is enclosed across the heat-sealed area, and the external appearance of the product is likewise damaged.

SUMMARY OF THE INVENTION

Accordingly, it is an object of the present invention to provide an improvement in a sealing method that accomplishes the sealing without damaging the external appearance of a packaging bag in a case that the bag filled with packaged matter or content is ultrasonically sealed at its opening area and then heat-sealing is performed.

It is another object of the present invention to provide a sealing method that can prevent the contamination of the bag surfaces and heating plates, etc. of a heat-sealing device by any liquid substance in cases where the packaged matter is a liquid substance.

The above objects are accomplished by unique steps of the present invention for a packaging bag sealing method which seals an opening area of a packaging bag that is filled with packaged matter or content; and in the present invention:

ultrasonically sealing an area of the packaging bag where the packaged matter is present inside the packaging bag, and heat-sealing another area of the packaging bag which is separated from the ultrasonically sealed area by a predetermined distance toward an edge portion of the mouth of the packaging bag, so that a portion of the packaged matter, which is separated upward by the ultrasonically sealed area, is confined within an area between the ultrasonically sealed area and the heat-sealed area.

In the above method of the present invention, it is preferable that the upper end of the heat-sealed area extend to the edge portion of the mouth of the bag; and the "packaged matter" includes substances other than liquid substances.

Furthermore, it is preferable that the entire heat-sealed area be cooled by way of press-holding the area by a pair of cooling plates following the heat-sealing.

In the packaging bag that is obtained by the above method:

an ultrasonically-sealed area is formed by ultrasonically sealing an area that is separated from an edge portion of the mouth of the packaging bag with a predetermined spacing, and a heat-sealed area formed in a position that is separated from the ultrasonically-sealed area by a predetermined distance toward the edge portion of the mouth of the packaging bag; and a portion of the packaged matter is confined within a space between the ultrasonically-sealed area and the heat-sealed area.

In case that the packaged matter is a liquid substance, the method of the present comprises the steps of:

ultrasonically sealing an area of a packaging bag where the liquid substance is present inside the packaging bag; and heat-sealing another area of the packaging bag which is above the ultrasonically sealed area without any spacing in between by way of press-holding such an area by a pair of heating plates, and simultaneously heating still another area that is above the heat-sealed area without press-holding such another area by the heating plates.

The portion of the heat-sealed area may overlap with all or part of the ultrasonically sealed area.

As to the, pair of heating plates, each heating plate may have a structure that includes: a pressing surface that has a specified width in the direction of the height of the heating plate, and a non-pressing surface that has a specified width in the direction of the height of the heating plate in a position above the pressing surface and that is formed in a more retracted position than the pressing surface.

In the method of the present invention, after the heat-sealing (first heat-sealing) is performed, the position above the heat-sealed area can be further heat-sealed (second heat-sealing) to the edge of the mouth of the bag. The second heat-sealing can be performed on both the first heat-sealed area and the ultrasonically sealed area.

Furthermore, in the above method of the present invention, it is preferable that the entire heat-sealed area be cooled by way of press-holding the area by a pair of cooling plates. This cooling is performed after the heat-sealing when the heat-sealing is performed a single time, and after the second heat-sealing when the heat-sealing is performed twice.

DETAILED DESCRIPTION OF THE INVENTION

The present invention will be described more concretely below with reference to FIGS. 1 through 3 and to FIG. 4.

Figure 1:
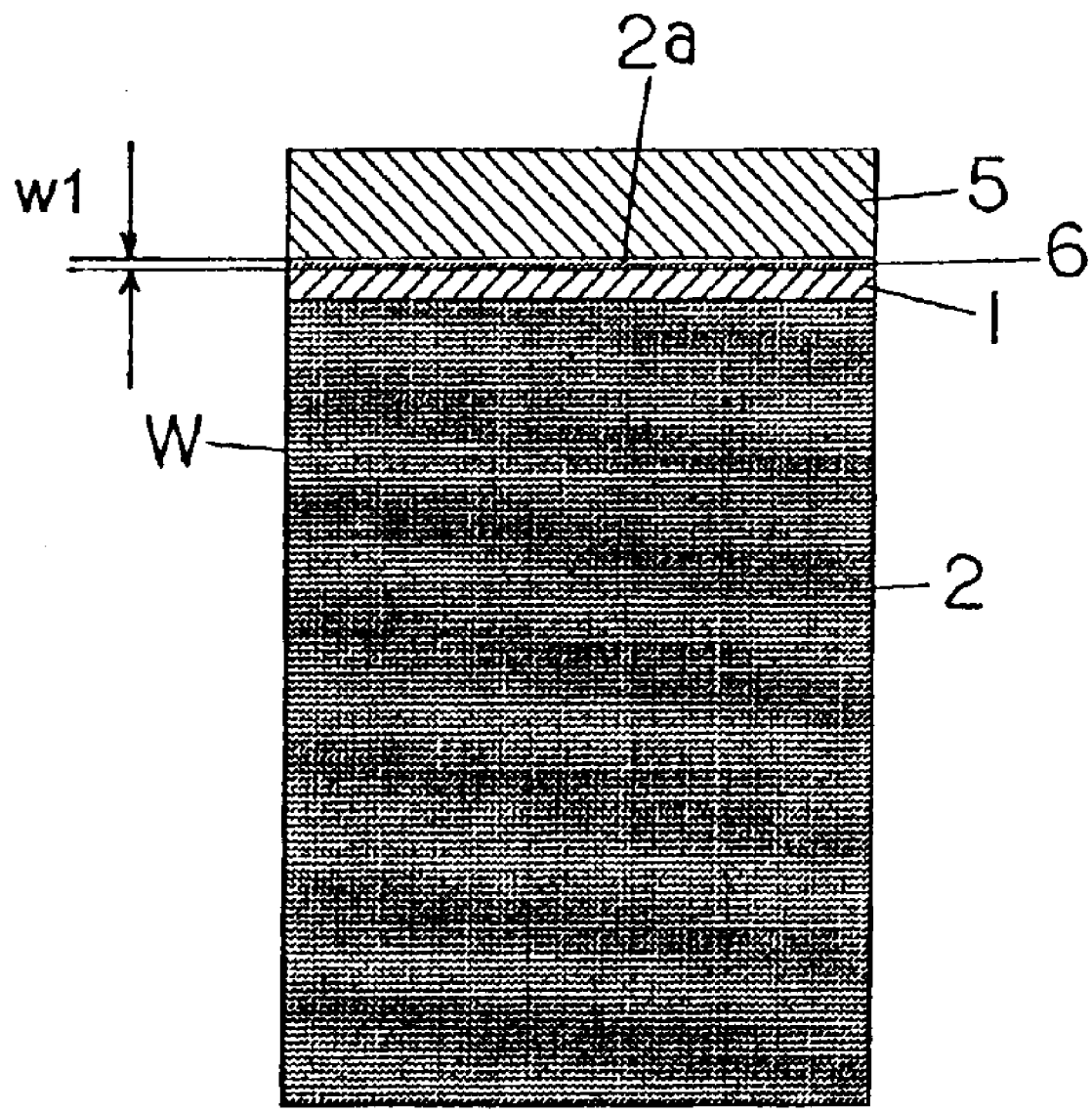
FIG. 1 is a schematic diagram of a packaging bag that is obtained by the sealing method of the present invention.

The packaging bag W shown in FIG. 1 is a bag that is filed with a liquid substance 2 (a mixture consisting mainly of water). After being ultrasonically sealed at 1 in the horizontal direction as shown in FIG. 4, an area of the bag that is separated from the ultrasonically sealed area 1 by a predetermined distance toward the edge portion of the mouth (upper end) of the bag is heat-sealed in the horizontal direction. In the shown example, the heat-sealed area 5 reaches the edge of the mouth of the bag. However, it is not absolutely necessary that this heat-sealed area 5 reach the edge of the mouth. A liquid substance 2a which is separated by and is above the ultrasonically sealed area 1 is hermetically sealed between the ultrasonically sealed area 1 and the heat-sealed area 5. For instance, heat-sealing that uses a pair of heating plates or impulse sealing that uses a heater wire can be used in the present invention when the heat-sealing is executed.

The liquid substance 2a is sealed within a narrow space 6 between the horizontal ultrasonically sealed area 1 and the heat-sealed area 5. Accordingly, there is no particular damage to the external appearance of the bag. Furthermore, since the space 6 is present, the liquid substance is not squeezed into the bag mouth by the pressing surfaces of heating plates (described below), etc. during the process of heat-sealing, and contamination of the pressing surfaces and bag surfaces is avoided. The width w1 of this space 6 depends on the amount (set amount) of the liquid substance 2a that is separated and is present above the ultrasonically sealed area 1. It is preferable that the width w1 be as small as possible.

Furthermore, even in cases where the packaged matter is a foodstuff, there are no problems in terms of hygiene, since the bag containing such a foodstuff is sealed.

Figure 2B:
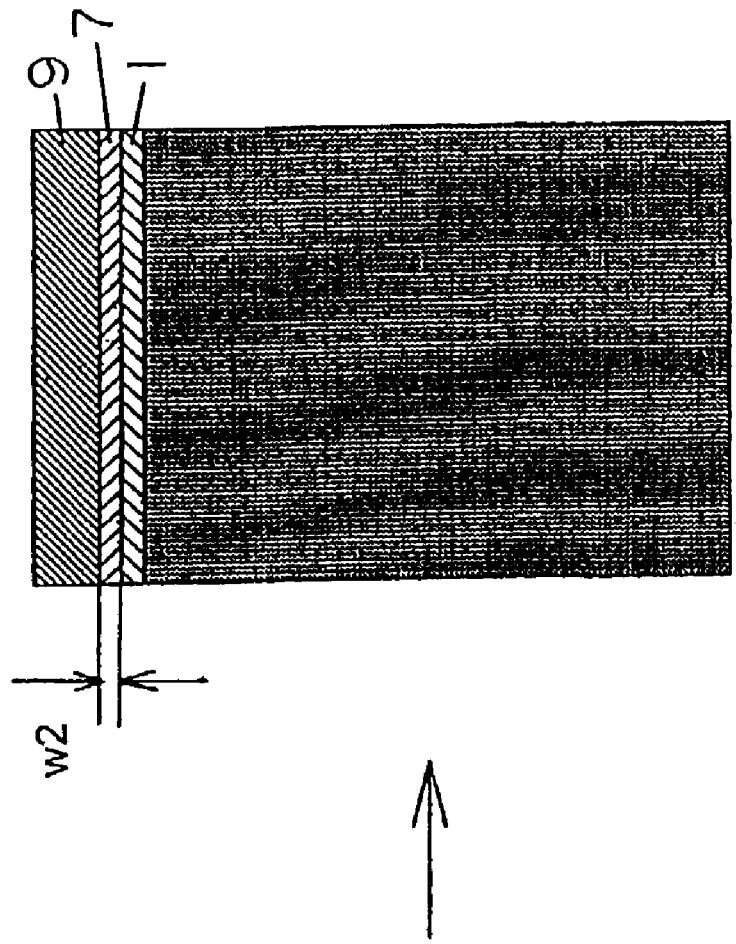
FIG. 2(b) shows the state upon completion of the heat-sealing.
Figure 2A:
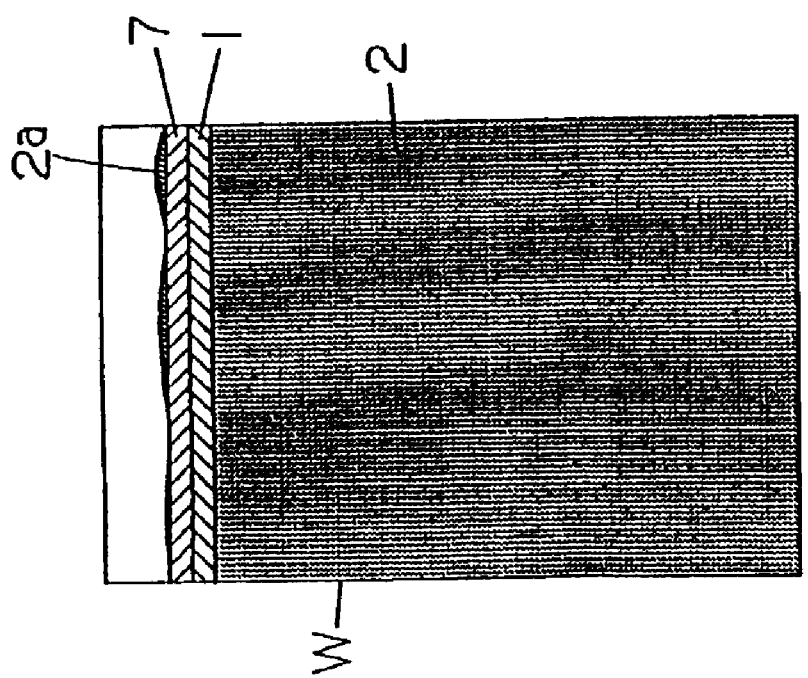
FIG. 2(a) is a schematic diagram of a packaging bag for describing another sealing method of the present invention showing the state immediately following the press-holding by the heating plates.
Figure 4:
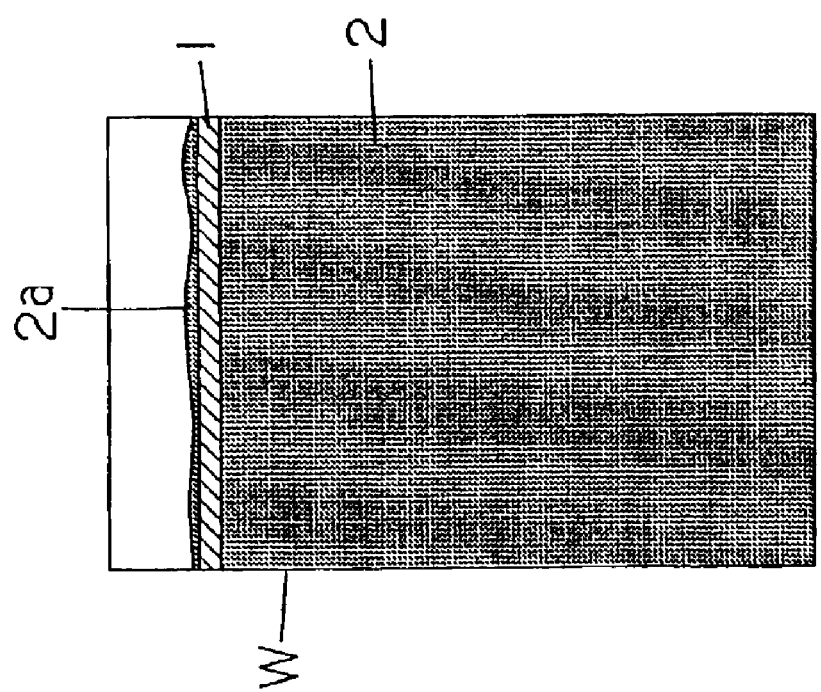
FIG. 4 is a schematic diagram that illustrates the ultrasonic sealing.

In the packaging bag W shown in FIGS. 2(a) and 2(b), the bag W is ultrasonically sealed at 1 in the horizontal direction as shown in FIG. 4, after which the area above the ultrasonically-sealed area 1 is heat-sealed by way of press-holding the area by a pair of heating plates without leaving any gap between the ultrasonically-sealed area 1 and the heat-sealed area, thus forming a heat-sealed area 7; and the area above the heat-sealed area 7 is simultaneously heated without press-holding the area by the heating plates. FIG. 2(a) shows the state immediately after press-holding by the heating plates, and FIG. 2(b) shows the state when the heat-sealing is completed.

Figure 3:
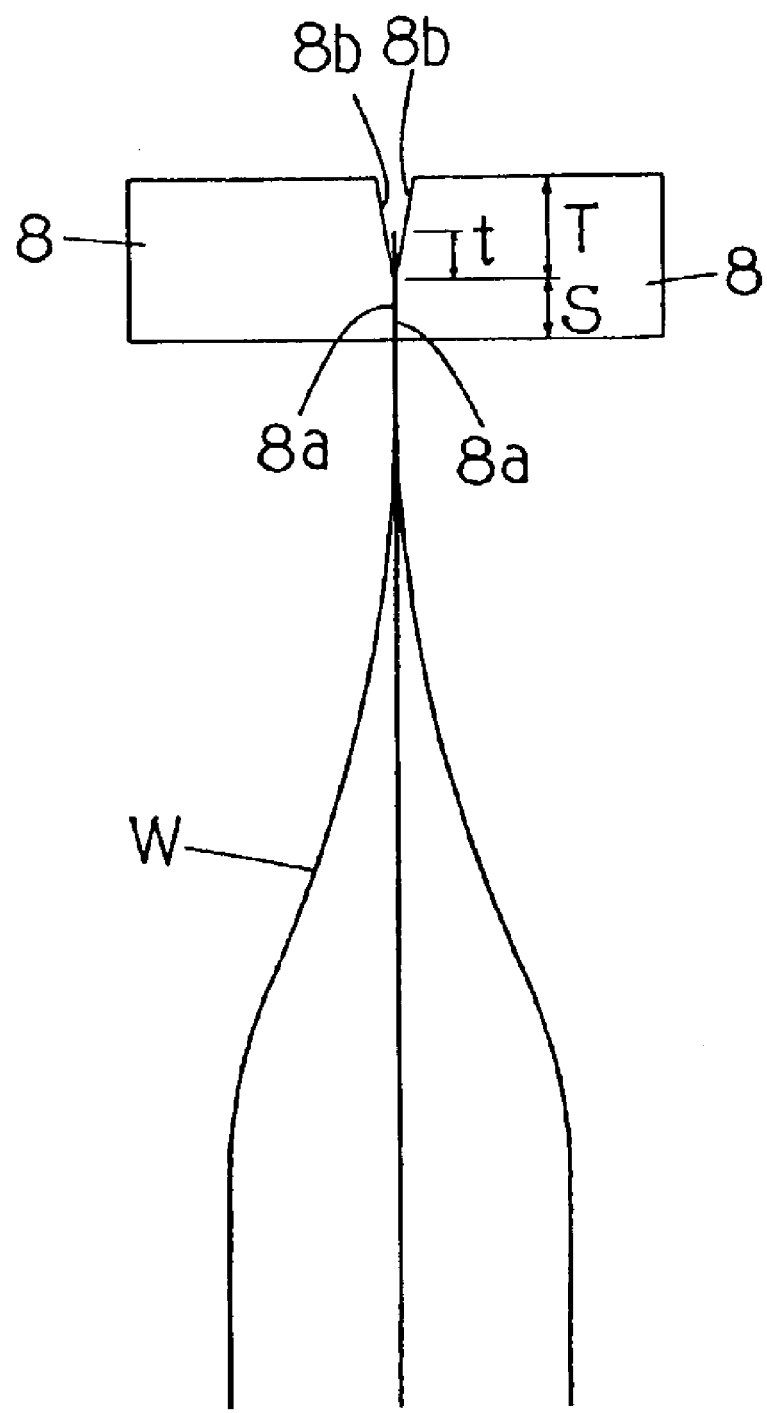
FIG. 3 is a schematic side view of the heating plates (and a part of a packaging bag) used for executing the heat-sealing in the present invention.
Figure 5:
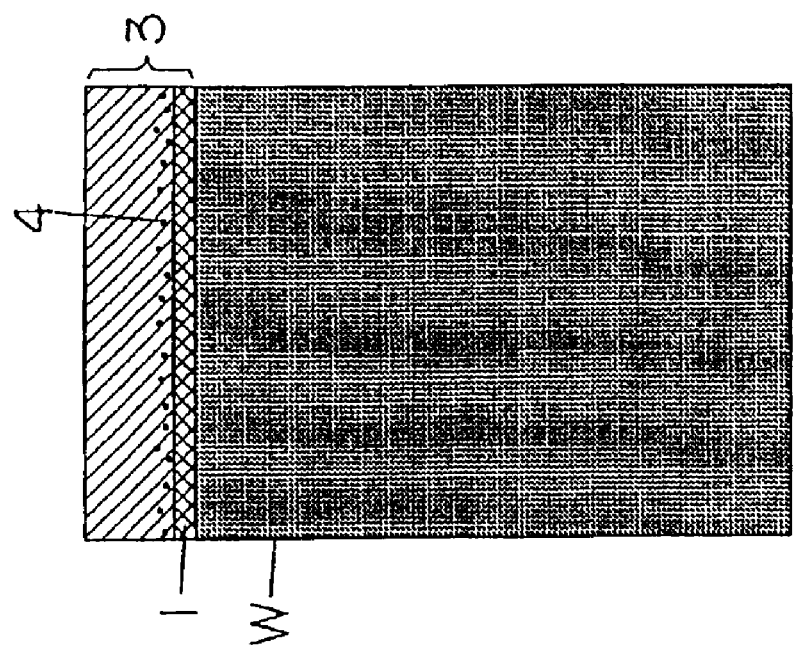
FIG. 5 is a schematic diagram that illustrates a conventional sealing method.

FIG. 3 shows the pair of heating plates 8 used in the above method.

The heating plates 8 have pressing surfaces 8a that have a specified width S (this width corresponds to the width w2 of the heat-sealed area 7) in the direction of the height of the heating plates 8 in FIG. 3. The heating plates 8 further have non-pressing surfaces 8b. The non-pressing surfaces 8b have a specified width T in the direction of the height of the heating plates 8 and are provided above the pressing surfaces 8a. The non-pressing surfaces 8b are formed so as to be retracted in the left-right direction than the pressing surfaces 8a, thus being slanted surfaces. The pressing surfaces 8a face each other, and so do the non-pressing surfaces 8b. An intended heat-sealing location (heat-sealed area 7) of the packaging bag W is press-held by the pressing surfaces 8a. The width T of the non-pressing surfaces 8b in the direction of the height of the heating plates 8 is set so as to be greater than the height t of the bag that is above the heat-sealed area 7.

With the heating plates 8 that are structured as described above, when a specified position of the packaging bag W that is in the state shown in FIG. 4 is press-held by the heating plates 8, the intended heat-sealing area above the ultrasonically-sealed area 1 is first press-held by the pressing surfaces 8a. In this case, the liquid substance 2a (that is a portion of the liquid substance 2) adhering to the inside of the bag adjacent to the ultrasonically-sealed area 1 is squeezed by the pressing surfaces 8a so that this liquid substance escapes upward (FIG. 2(a)). However, this liquid substance is not squeezed to an extent that the liquid substance would be squeezed out of the edge of the mouth of the bag. Accordingly, contamination of the heating plates 8 and bag surfaces is avoided.

Furthermore, by way of setting the width S of the pressing surfaces 8a in the direction of the height at a small value, there is almost no "biting in" of the liquid substance 2a (accordingly, there is a reduction in the amount of gas bubbles in the heat-sealed area 7). Furthermore, even if there is some "biting in", there is no great damage to the external appearance of the product. In this sense, the width S of approximately 2 mm or greater but less than 5 mm is appropriate.

Heat-sealing of the bag is performed by the pressing surfaces 8a of the heating plates 8; and at the same time, the liquid substance 2a that has moved above the pressing surfaces 8a level is heated by conducted heat from the pressing surfaces 8a and radiant heat from the non-pressing surfaces 8b. Thus, the moisture evaporates.

The heat-sealed area 7 is fused by this heat-sealing, but the upper region 9 that extends from the top of the heat-sealed area 7 to the edge of the mouth of the bag is not fused. However, both surfaces of the bag in the upper region 9 are in close contact to each other in the process of this heat-sealing, and this upper region 9 appears as if it is sealed, and the solid matter that remains following the evaporation of the moisture adheres to the bag in this region (see FIG. 2(b)). When the amount of solid matter in the liquid substance is small, then the amount of residual solid matter is small, and such a solid matter is therefore not noticeable to an extent that damages the external appearance.

The final product can be obtained in the state shown in FIG. 2(b). However, in terms of closing the mouth of the bag, it is preferable to heat-seal the upper region 9. In this case, sealing can be performed so that the heat-sealed area 7 is included in such heat-sealing and so that the ultrasonically-sealed area 1 is also included in such heat-sealing. Since the liquid substance that is present in the upper region 9 is evaporated by the heating, the pressing surfaces of the heating plates, etc. or the surface of the bag are not contaminated during the heat-sealing process.

Furthermore, it is preferable that the sealed areas as a whole be press-held by cooling plates following the final heat-sealing. With such a cooling, the esthetic appearance of the sealed area can be further improved.

As seen from the above, according to the present invention, a seal that does not damage the external appearance of the product can be formed when the opening area of a packaging bag filled with packaged matter is ultrasonically sealed and then heat-sealed. Furthermore, in cases where the packaged matter is a liquid substance, contamination of the pressing surfaces of the heat-sealing device and the surfaces of the bag by the liquid substance can be avoided.

What is claimed is:

1. A packaging bag sealing method which seals an opening area of a packaging bag that is filled with packaged matter, said method comprising the steps of:

ultrasonically sealing an area of said packaging bag where said packaged matter is present inside said packaging bag, and heat-sealing another area of said packaging bag which is separated from said ultrasonically sealed area by a predetermined distance toward an edge portion of a mouth of said packaging bag, thus allowing a portion of said packaged matter to be coned between said ultrasonically sealed area and said heat-sealed area, said portion of said packaged matter being separated upward by said ultrasonically sealed area.

2. A packaging bag sealing method which seals an opening area of a packaging bag that is filled with a liquid substance, said method comprising the steps of:

ultrasonically sealing an area of said packaging bag where said liquid substance is present inside said packaging bag, and heat-sealing another area of said packaging bag which is above said ultrasonically scaled area without any spacing in between by way of press-holding said another area by a pair of hewing plates, and simultaneously heating a still another area above said heat-sealed area without press-holding said still another area by said heating plates.

3. The packaging bag sealing method according to claim 2, further comprising the step of heat-sealing an area which is above said heat-sealed area to said edge portion of said mouth of said packaging bag.

4. The pack bag sealing method according to claim 1, further comprising the step of cooling entire sealed areas by way of press-holding said entire sealed areas by a pair of cooling plates.

5. The packaging bag sealing method according to claim 2, further comprising the step of cooling entire sealed areas by way of press-holding said entire sealed areas by a pair of cooling plates.

6. The packaging bag sealing method according to claim 3, further comprising the step of cooling entire sealed areas by way of press-holding said entire sealed areas by a pair of cooling plates.

* * * * *